(12) United States Patent
Vahabzadeh et al.

(10) Patent No.: US 7,246,673 B2
(45) Date of Patent: Jul. 24, 2007

(54) HYBRID POWERTRAIN WITH ENGINE VALVE DEACTIVATION

(75) Inventors: Hamid Vahabzadeh, Oakland, MI (US); Peter J. Savagian, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/851,394

(22) Filed: May 21, 2004

(65) Prior Publication Data

US 2005/0257967 A1 Nov. 24, 2005

(51) Int. Cl.
*B60K 1/00* (2006.01)
*F01L 9/04* (2006.01)

(52) U.S. Cl. ............... 180/65.2; 180/65.8; 123/90.12; 123/90.16

(58) Field of Classification Search ............. 180/65.1, 180/65.2, 65.3, 65.4, 65.8, 301; 123/481, 123/315, 323, 347, 90.16, 90.12, 90.23, 90.24; 701/22, 112, 102, 105; 475/151, 153, 2
See application file for complete search history.

(56) References Cited

U.S. PATENT DOCUMENTS

| | | | |
|---|---|---|---|
| 4,779,589 A * | 10/1988 | Matsuura et al. | 123/315 |
| 5,725,064 A * | 3/1998 | Ibaraki et al. | 180/65.2 |
| 5,730,675 A * | 3/1998 | Yamaguchi | 475/2 |
| 5,899,828 A * | 5/1999 | Yamazaki et al. | 123/323 |
| 6,230,682 B1 * | 5/2001 | Gustafsson et al. | 123/323 |
| 6,321,704 B1 | 11/2001 | Church et al. | 123/90.16 |
| 6,321,705 B1 | 11/2001 | Fernandez et al. | 123/90.16 |
| 6,497,207 B2 | 12/2002 | Spath et al. | 123/90.16 |
| 6,513,470 B1 | 2/2003 | Hendriksma et al. | 123/90.16 |
| 6,516,254 B1 | 2/2003 | Wakashiro et al. | 701/22 |
| 6,557,518 B1 | 5/2003 | Albertson et al. | 123/198 F |
| 6,584,951 B1 | 7/2003 | Patel et al. | 123/198 F |
| 6,637,387 B1 | 10/2003 | Gecim et al. | 123/90.16 |
| 6,763,298 B2 * | 7/2004 | Boggs et al. | 701/112 |
| 6,830,536 B2 * | 12/2004 | Tanaka et al. | 123/347 |
| 6,837,320 B2 * | 1/2005 | Wakashiro et al. | 180/65.2 |
| 6,857,491 B2 * | 2/2005 | Wakashiro et al. | 180/65.2 |
| 6,938,598 B1 * | 9/2005 | Lewis et al. | 123/179.1 |
| 2003/0119623 A1 | 6/2003 | Stevenson et al. | 475/275 |

* cited by examiner

*Primary Examiner*—Hau Phan
(74) *Attorney, Agent, or Firm*—Dan L. Thompson

(57) ABSTRACT

A vehicle powertrain includes an engine and an electric motor in parallel hybrid combination. The engine includes a plurality of cylinders and a plurality of selectively deactivatable cylinder intake and exhaust valves so that every cylinder in the engine is characterized by an inoperative condition in which corresponding intake and exhaust valves remain in a closed position irrespective of crankshaft rotation. A controller is operatively connected to the valves and configured to advantageously control the valves and render cylinders inoperative. The powertrain enables the rotor of the motor to be continuously operatively connected to the crankshaft of the engine for unitary rotation therewith. The powertrain is preferably characterized by integrated friction launch wherein an active torque-transmitting mechanism controls vehicle launch.

16 Claims, 2 Drawing Sheets

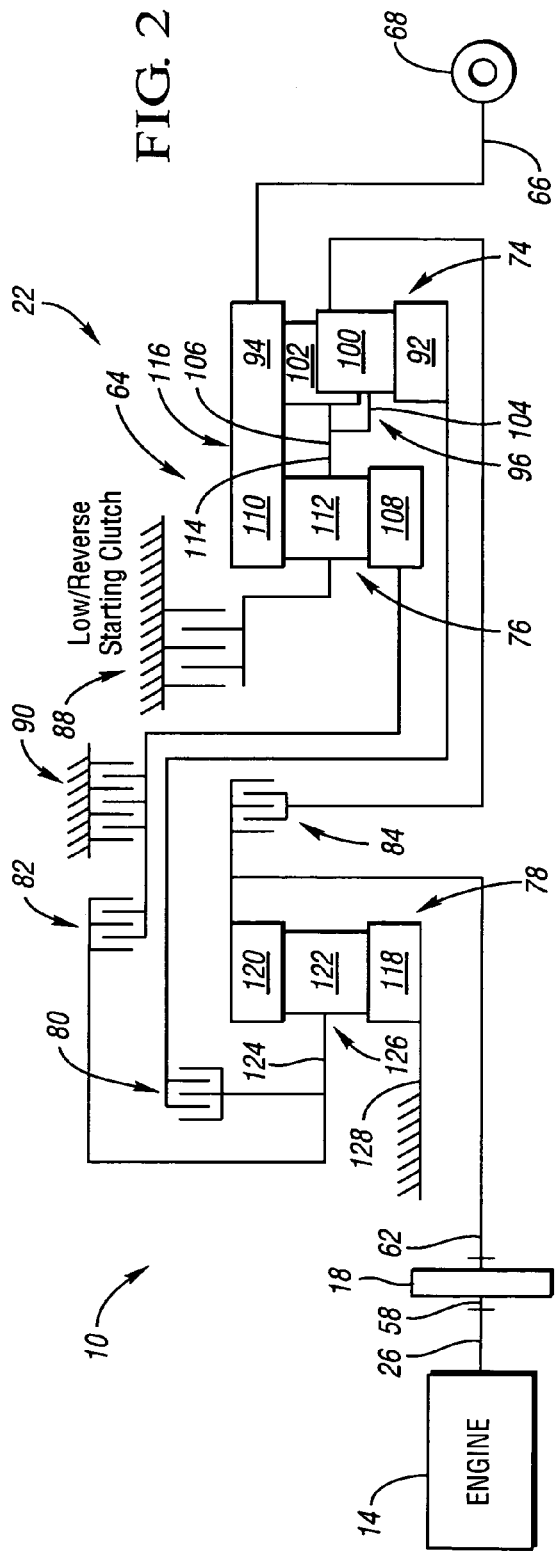
FIG. 2
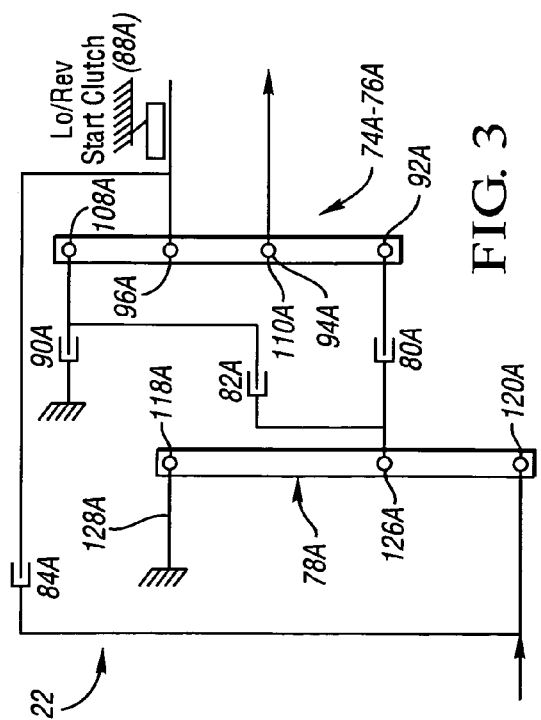
FIG. 3
| GEAR | CLUTCH (80) | CLUTCH (82) | CLUTCH (84) | CLUTCH (88) | CLUTCH (90) |
|------|-------------|-------------|-------------|-------------|-------------|
| R    | X           | X           |             | G           |             |
| N    | X           |             |             |             |             |
| 1st  | X           | X           |             | G           |             |
| 2nd  | X           |             |             |             | X           |
| 3rd  | X           | X           |             |             |             |
| 4th  |             |             | X           |             |             |
| 5th  |             | X           | X           |             |             |
| 6th  |             |             | X           |             | X           |
FIG. 4

HYBRID POWERTRAIN WITH ENGINE VALVE DEACTIVATION

TECHNICAL FIELD

This invention relates to hybrid vehicle powertrains that include an engine with a plurality of cylinders each having a plurality of selectively deactivatable valves operatively connected thereto.

BACKGROUND OF THE INVENTION

Prior art hybrid powertrains typically include an internal combustion engine, an electric motor, and a transmission. The crankshaft of the engine, the rotor of the motor, and the input shaft of the engine are selectively interconnected by various torque-transmitting mechanisms. These torque-transmitting mechanisms have been necessary in the prior art to disengage the engine from the motor and to disengage the engine and the motor from the transmission.

More specifically, in a typical prior art hybrid powertrain, the crankshaft of the engine is selectively connected to the rotor of the motor by a clutch. When the clutch is engaged, the crankshaft and rotor rotate in unison; when the clutch is disengaged, the engine is disconnected from the rotor and the transmission. In one mode of powertrain operation, the clutch is engaged, and the engine, either by itself or in combination with the motor, supplies motive power to the drive wheels via the transmission. In another mode of powertrain operation, the motor supplies all motive power to the drive wheels, and the clutch is disengaged in order to prevent the motor from turning the crankshaft and attendant pumping losses as air is drawn through the intake manifold, engine cylinders, and exhaust manifold. Similarly, during regenerative braking, the clutch must be disengaged to prevent crankshaft rotation and attendant pumping losses.

The rotor of the motor is connected to the transmission via a hydrodynamic fluid drive such as a torque converter. The torque converter provides a fluid coupling between the motor rotor and the transmission input shaft upon sufficient rotor torque and speed.

Many vehicle accessories, such as power steering pumps and HVAC compressors, are connected to the crankshaft by belts, chain drives, etc., to be driven by the engine. Thus, the engine must be on and consuming fuel to drive the accessories, even when only the motor is propelling the vehicle or when the vehicle is at rest.

SUMMARY OF THE INVENTION

A vehicle powertrain is provided. The powertrain includes an engine having a plurality of cylinders. Every cylinder in the engine has a corresponding plurality of selectively activatable and deactivatable cylinder valves operatively connected thereto. Every cylinder in the engine is characterized by an operative condition in which the corresponding cylinder valves are activated, and an inoperative condition in which the corresponding cylinder valves are deactivated. An electric motor is in hybrid combination with the engine, and a transmission is operatively connected to the motor and the engine.

An engine wherein all cylinders may be selectively rendered inoperative irrespective of crankshaft rotation provides significant benefits during hybrid powertrain operation. For example, in a preferred embodiment, the powertrain includes a controller that is configured to selectively activate and deactivate the cylinder valves. The controller is also configured to selectively cause a mode of engine operation wherein a first cylinder is in the operative condition while a second cylinder is in the inoperative condition during a first time period. During a second time period, the first cylinder is in the inoperative condition while the second cylinder is in the operative condition. During this mode of operation, which may occur, for example, when the electric motor is providing all motive power to propel the vehicle, fuel is conserved because not all cylinders are operative and pumping losses are reduced. The cylinders remain hot by alternating which of the cylinders is operative and firing, and which of the cylinders are inoperative.

In another preferred embodiment, a controller is sufficiently configured to selectively activate and deactivate the valves, and configured to cause a mode of engine operation in which every cylinder in the engine is in the inoperative condition by deactivating all the cylinder valves when a predetermined state exists, such as when the motor is supplying all motive power and during regenerative braking. The powertrain of the invention thus improves upon the prior art by enabling the elimination of the clutch between the rotor and the crankshaft found in the prior art because the rotor can turn the crankshaft without attendant pumping losses in the engine.

Accessories, such as a power steering pump and HVAC compressor, that may be connected to the crankshaft are driven by the motor turning the crankshaft when all engine cylinders are inoperative. Thus, the powertrain of the invention improves upon the prior art by enabling accessories operatively connected to the crankshaft to be driven by the motor when all engine cylinders are inoperative, thereby conserving fuel; the engine need not remain on merely to power accessories. The powertrain also minimizes loss of catalytic converter temperature compared to the prior art because cool gases are not being pumped through the exhaust system when all cylinders are inoperative.

The powertrain of the invention also eliminates the need for a separate starter motor and input clutch, as required by prior art powertrains, because the motor can start the engine by turning the crankshaft when at least one of the cylinders is operative.

Moreover, when the engine is commanded to supply motive power by the vehicle driver or an engine controller, the powertrain of the invention provides improved response compared to the prior art because the crankshaft may be driven by the motor when cylinders are inoperative without pumping losses, and thus the crankshaft may be continuously rotating at the same speed as the rotor and the input shaft. There would thus be no latency period during which the engine crankshaft and a torque converter must gain speed. If all engine cylinders are inoperative when commanded to supply motive power, the valves are simply activated so that intake and exhaust valves operate and the engine starts.

In a preferred embodiment, the transmission is characterized by the absence of a hydrodynamic fluid drive between the crankshaft, the rotor, and the input shaft. Instead, an active torque-transmitting mechanism such as a selectively engageable and disengageable clutch is employed for vehicle launch. In an exemplary embodiment, the input shaft is continuously connected to the rotor and the crankshaft for rotation therewith. The input shaft is also continuously connected to a member of a torque multiplying device, such as a planetary gear member, for rotation therewith. A selectively operable friction torque-transmitting mechanism that controls the torque-transmitting operation of a member of the torque multiplying device in the transmission is also employed to initiate operation, i.e., launch.

In another aspect of the invention, a hybrid vehicle powertrain includes an engine having at least one cylinder. A plurality of selectively activatable and deactivatable cylinder valves is operatively connected to the at least one cylinder so that the at least one cylinder is characterized by an operative condition in which the plurality of cylinder valves are activated, and an inoperative condition in which the plurality of valves are deactivated. The powertrain also includes an electric motor in hybrid combination with the engine, and a transmission operatively connected to the engine and the motor. A controller is operatively connected to the cylinder valves. The engine is characterized by an idle mode, and the controller is configured to deactivate the plurality of cylinder valves so that the at least one cylinder is in the inoperative condition when the engine is in the idle mode.

The above features and advantages, and other features and advantages, of the present invention are readily apparent from the following detailed description of the best mode for carrying out the invention when taken in connection with the accompanying drawings.

BRIEF DESCRIPTION OF THE DRAWINGS

FIG. 2 is a schematic representation of a multi-speed planetary gear arrangement in the transmission of FIG. 1;

FIG. 3 is a lever diagram of the planetary gear arrangement shown in FIG. 2; and FIG. 4 is a truth table chart describing the engagement pattern for the torque-transmitting mechanisms associated with the power transmission shown in FIG. 2.

DESCRIPTION OF THE PREFERRED EMBODIMENT

Figure 1:
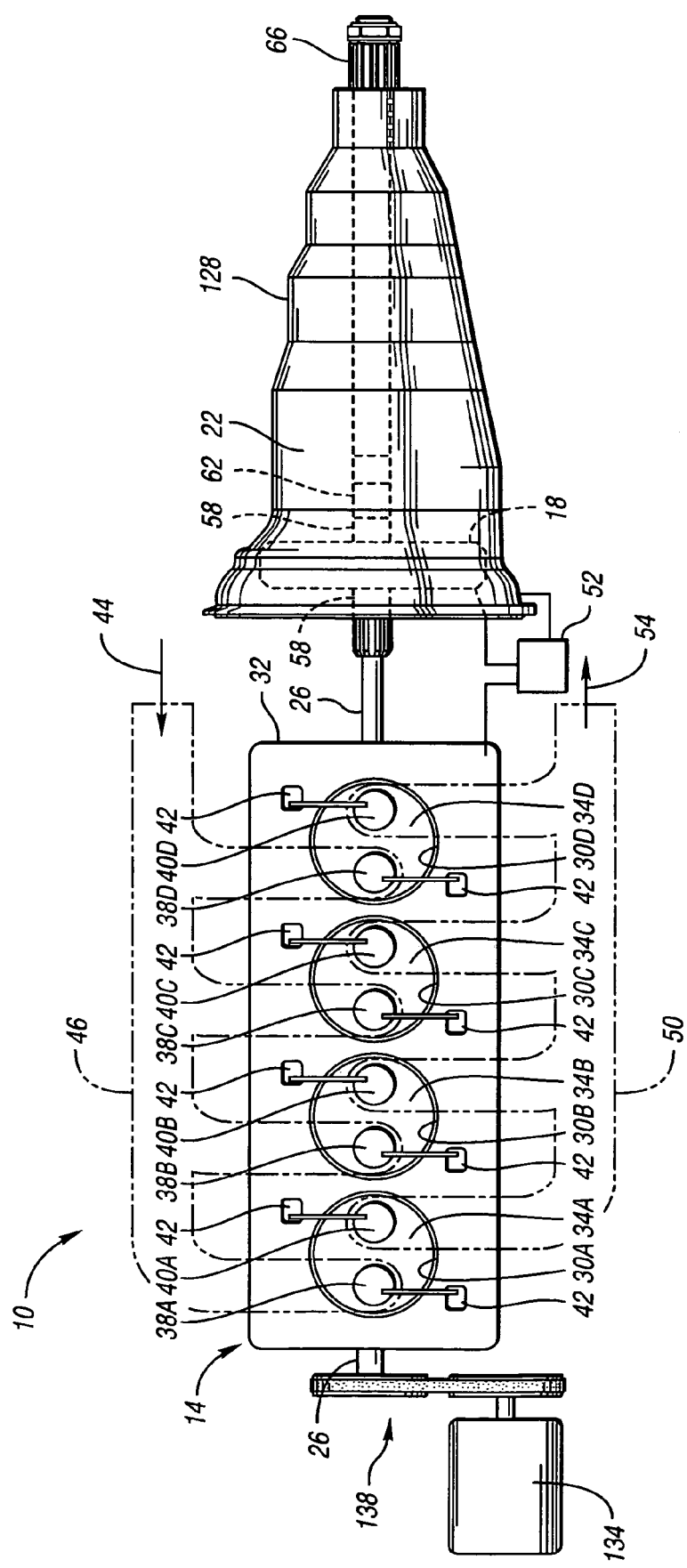
FIG. 1 is a schematic illustration of a vehicle powertrain including an engine, an electric motor, and an automatic transmission.

Referring to FIG. 1, a vehicle powertrain 10 is schematically depicted. The powertrain 10 includes an engine 14, an electric motor 18, and an automatic transmission 22. The engine 14 includes a rotatable crankshaft 26, a plurality of cylinders 30A-D formed in engine block 32, and a plurality of selectively activatable and deactivatable cylinder valves, namely intake valves 38A-D and exhaust valves 40A-D. The engine also includes a plurality of pistons 34A-D, each being translatable within one of the plurality of cylinders 30A-D.

Each of the intake valves 38A-D is movable between an open position in which gas (e.g., air 44) may be drawn into a corresponding cylinder 30A-D through an intake port during each intake stroke of the corresponding piston 34A-D, and a closed position to prevent gas from being drawn into the corresponding cylinder 30A-D. Each exhaust valve 40A-D is movable between an open position in which exhaust gas 54 can be exhausted from a corresponding cylinder 30A-D during each exhaust stroke of the corresponding piston 34A-D, and a closed position to prevent gas from being exhausted from the corresponding cylinder 30A-D.

Every cylinder 30A-D in the engine 14 is characterized by an operative condition in which the corresponding cylinder valves 38A-D, 40A-D are activated, and an inoperative condition in which the corresponding cylinder valves 38A-D, 40A-D are deactivated.

More specifically, each of the intake valves 38A-D is spring-biased in the closed position, and includes a respective valvetrain mechanism 42 such as a camshaft-actuated rocker arm. When an intake valve is activated, the valvetrain mechanism causes the intake valve 38A-D to open during each intake stroke of its corresponding piston 34A-D to admit air into the corresponding cylinder 30A-D from the atmosphere via an intake manifold 46. Thus, when an intake valve 38A-D is activated, it opens and closes once during every two rotations of the crankshaft. When an intake valve 38A-D is deactivated, it remains closed irrespective of crankshaft rotation.

Similarly, each of the exhaust valves 40A-D is spring-biased in the closed position, and includes a respective valvetrain mechanism 42 such as a camshaft-actuated rocker arm. When an exhaust valve is activated, the valvetrain mechanism causes the exhaust valve 40A-D to open during each exhaust stroke of its corresponding piston 34A-D to expel exhaust gas 54 from the corresponding cylinder 30A-D to the atmosphere via an exhaust manifold 50. Thus, when an exhaust valve 40A-D is activated, it opens and closes once during every two rotations of the crankshaft. When an exhaust valve 40A-D is deactivated, it remains closed irrespective of crankshaft rotation.

Those skilled in the art will recognize multiple techniques and valvetrain configurations that may be employed to achieve selective deactivation of the cylinder valves 38A-D, 40A-D. Exemplary valves configured for selective valve deactivation during crankshaft rotation are described in U.S. Pat. No. 6,321,704, issued Nov. 27, 2001 to Church et al; U.S. Pat. No. 6,321,705, issued Nov. 27, 2001 to Fernandez et al; U.S. Pat. No. 6,497,207, issued Dec. 24, 2002 to Spath et al; U.S. Pat. No. 6,513,470, issued Feb. 4, 2003 to Hendriksma et al; U.S. Pat. No. 6,557,518, issued May 6, 2003 to Albertson et al; U.S. Pat. No. 6,584,951, issued Jul. 1, 2003 to Patel et al; and U.S. Pat. No. 6,637,387, issued Oct. 28, 2003 to Gecim et al, each of which is hereby incorporated in its entirety.

A powertrain controller 52 is operatively connected to each valvetrain mechanism 42 to individually control each of the cylinder valves 38A-D, 40A-D; i.e., the controller 52 is configured to selectively activate and deactivate each of the valves 38A-D, 40A-D. The powertrain controller 52 is configured to operate the engine in a first mode of operation wherein the controller controls all cylinder valves 38A-D, 40A-D such that each intake valve 38A-D is activated and opens during an intake stroke of the corresponding piston 34A-D, and each exhaust valve is activated and opens during an exhaust stroke of the corresponding piston 34A-D during crankshaft rotation.

The powertrain controller 52 is also configured to operate the engine 14 in a second mode of operation wherein all cylinder valves 38A-D, 40A-D are deactivated such that each intake valve 38A-D and each exhaust valve 40A-D remains closed irrespective of crankshaft 26 rotation to prevent any engine cylinder 30A-D from drawing gas therein or from exhausting gas therefrom. Accordingly, the crankshaft 26 may rotate in the second mode of operation with no pumping action of the engine 14; i.e., no air 44 is drawn into the intake manifold 46 and cylinders 30A-D, and no exhaust gas 54 is pumped from the cylinders 30A-D and the exhaust manifold 50 into the atmosphere.

The powertrain controller 52 is also configured to operate the engine 14 in a third mode of operation wherein the valves for at least one cylinder are activated, and the valves for at least one other cylinder are deactivated. For example, in a preferred embodiment, the powertrain controller 52 causes the valves 38A, 40A for a first cylinder 30A to be activated so that the first cylinder 30A is operative, while the controller 52 causes the valves 38B-D, 40B-D to be deactivated so that cylinders 30B-D are inoperative for a first predetermined period of time. In such a situation, cylinder 30A will continue operating and producing power (at least power sufficient to maintain engine idle), while the other cylinders 30B-D will neither draw air in or exhaust gas out, thereby minimizing pumping losses in the engine.

The controller 52 alternates which of the cylinders 30A-D are operative in the third engine mode of operation. During a second time period subsequent to the first time period, the powertrain controller 52 will cause the valves 38B, 40B associated with cylinder 30B to be activated so that cylinder 30B will remain operative, and cause the valves 38A, 40A, 38C-D, 40C-D associated with cylinders 30A, 30C, 30D to be deactivated, so that cylinders 30A, 30C, and 30D are inoperative. Similarly, during a third time period, the powertrain will cause cylinder 30C to remain operative while rendering cylinders 30A, 30B, and 30C inoperative. During a fourth time period, the powertrain controller will cause cylinder 30D to remain operative while rendering cylinders 30A-C inoperative. By alternating which of the cylinders remain operative in the third mode of engine operation, each of the cylinders may remain hot for optimum combustion characteristics when the first mode of engine operation is resumed.

The controller 52 is also preferably configured to cause at least one of the cylinders 30A-D to be inoperative when the engine is in idle mode. In the context of the present invention, "idle mode" is defined as zero commanded engine torque. Thus, the engine produces substantially no torque beyond what is necessary to overcome pumping losses and friction losses in idle mode.

The electric motor 18 is in parallel hybrid combination with the engine 14. In the embodiment depicted, the electric motor 18 includes a rotor 58 that is continuously connected to the crankshaft 26 for unitary rotation therewith, i.e., no disengageable torque-transmitting mechanism interconnects the rotor 58 and the crankshaft 26.

Those skilled in the art will recognize a variety of transmission configurations that may be employed within the scope of the claimed invention. For example, the transmission 22 may be a continuously variable transmission (CVT), automatically-shifted manual transmission (MTA), dual clutch transmission, etc. Preferably, an active torque-transmitting mechanism, such as a selectively engageable friction clutch, is configured for vehicle launch thereby to eliminate a hydrodynamic fluid coupling such as a torque converter.

In a preferred embodiment, the rotor 58 is continuously connected to the input shaft 62 of the transmission 22 for unitary rotation therewith. The transmission 22 includes a planetary gear arrangement (as shown at 64 in FIG. 2), and is characterized by friction launch; accordingly, the powertrain 10 is characterized by the absence of a hydrodynamic fluid drive between the crankshaft 26, rotor 58, input shaft 62, and the planetary gear arrangement. An exemplary transmission 22 with friction launch is described in U.S. Ser. No. 10/295,120, filed Nov. 15, 2002 (Publication No. 2003-0119623), assigned to the assignee of the present invention, and is hereby incorporated by reference in its entirety.

Referring to FIG. 2, wherein like reference numbers refer to like components from FIG. 1, the transmission 22 further includes an output shaft 66 operatively and directly interconnecting the planetary gear arrangement 64 and final drive mechanism 68. Planetary gear arrangement 64 includes a compound planetary gearset 74, two simple planetary gearsets 76 and 78, three selectively engageable rotating torque-transmitting mechanisms 80, 82, 84 and two selectively engageable stationary torque-transmitting mechanisms 88, 90.

The rotating torque-transmitting mechanisms 80, 82 and 84 are conventional fluid-operated multi-plate clutch assemblies, the construction of which is well-known in the art of power transmissions. Likewise, the stationary torque-transmitting mechanisms 88 and 90 are conventional fluid-operated brake assemblies of either friction plate-type or band plate-type. The torque-transmitting mechanisms are controlled in engaged and disengaged states by a conventional electro-hydraulic mechanism (not shown), which includes a hydraulic valving arrangement and the powertrain controller (shown at 52 in FIG. 1).

First planetary gearset 74 is shown to include a sun gear 92, a ring gear 94, and a planet carrier assembly 96. Meshed pairs of pinion gears 100 and 102 are rotatably supported on pinion shafts 104 and 106, respectively, that extend between laterally-spaced carrier segments of carrier assembly 96. Pinion gears 100 mesh with sun gear 92 while pinion gears 102 mesh with ring gear 94.

Second planetary gearset 76 includes a sun gear 108, a ring gear 110, and a plurality of pinion gears 112 that are meshed with both sun gear 108 and ring gear 110. As seen, pinion gears 112 are rotatably supported on pinion shafts 114 that also extend between the laterally-spaced carrier segments of carrier assembly 96. Thus, carrier assembly 96 is common to both first planetary gearset 74 and second planetary gearset 76. A ring gear assembly 116 is defined by ring gear 94 of first gearset 74 and ring gear 110 of second planetary gearset 76 being connected together to rotate as a unitary component. Third planetary gearset 78 is shown to include a sun gear 118, a ring gear 120, and pinion gears 122 in meshed engagement with both sun gear 118 and ring gear 120. Pinion gears 122 are rotatably supported on shafts 124 extending between components of a carrier assembly 126. In addition, sun gear 118 is shown to be held stationary due to its direct connection to a stationary housing portion 128 of transmission 22.

With continued reference to FIG. 2, ring gear 120 is shown to be continually drivingly connected to crankshaft 26 and rotor 58 through input shaft 62. The output of planetary gear arrangement 64 is ring gear assembly 116 which is continually drivingly connected to final drive unit 68 through output shaft 66. Torque-transmitting mechanism 80 is operably arranged to control selective engagement of carrier assembly 126 with sun gear 92. Likewise, torque-transmitting mechanism 82 is operably disposed to control selective engagement of carrier assembly 126 with sun gear 108. In addition, torque-transmitting mechanism 84 is operably disposed between ring gear 120 and common carrier assembly 96. Torque-transmitting mechanism 88 is selectively engageable to control the torque-transmitting operation of a member, i.e. carrier 96, of a torque multiplying device, i.e., gear arrangement 64. That is, torque-transmitting device 88 is operably disposed to selectively control braking of common carrier assembly 96 and, as will be detailed, is further arranged to act as the low/reverse starting or "launch" clutch for automatic transmission 22. Finally, torque-transmitting mechanism 90 is operably disposed to control selective braking of sun gear 108 and carrier assembly 126.

Referring to FIG. 3, a lever diagram is shown which depicts the transmission 22 in a modified form. The corresponding numbers of the lever diagram will be given the same numeric designation as the components of transmission 22 with an "A" suffix. For example, lever arm 78A represents planetary gearset 78 and node 118A represents sun gear 118. Planetary gearsets 74 and 76 are combined as a single lever with the designation 74A-76A. Portion 74A consists of nodes 92A, 94A and 96A while the portion 76A consists of nodes 108A, 110A and 96A.

During operation of transmission 22, a neutral condition is established by disengaging all of the torque-transmitting mechanisms. To establish the reverse drive ratio, torque-transmitting mechanism 82 is fully engaged and torque-transmitting mechanism 88 is engaged under controlled conditions dependent on signals received by the controller. To provide a controlled launch, torque-transmitting mechanism 82 is fully engaged prior to initiation of engagement of torque-transmitting mechanism 88. Thus, torque-transmitting mechanism 88 is the launch device for the reverse drive ratio. Controlled engagement of torque-transmitting mechanism 88 operatively interconnects input shaft 62 and output shaft 66, and results in controlled launch or acceleration of the vehicle in which transmission 22 is installed. This ratio is referred to as the reverse launch ratio.

To establish the first forward drive ratio from the neutral condition, torque-transmitting mechanism 80 is fully engaged and torque-transmitting mechanism 88 is engaged under controlled conditions depending on the commands from the vehicle operator, as interpreted by the controller. The ratio thus established is also designated as the forward launch ratio. To provide a controlled launch, torque-transmitting mechanism 80 is fully engaged prior to initiation of engagement of torque-transmitting mechanism 88. Thus, torque-transmitting mechanism 88 is the launch device during the first forward drive ratio. As torque-transmitting mechanism 88 is engaged, the vehicle will accelerate in a controlled fashion.

The use of an active clutch for vehicle launch, rather than a passive device such as a hydrodynamic torque converter, provides flexibility in launch control. The controller is also configured for an alternative vehicle launch scenario wherein the controller causes torque-transmitting mechanisms 80, 88 to engage while the crankshaft, rotor, and input shaft are not rotating, and then causes the motor 18 to generate torque whereby the motor 18 is the operative vehicle launch device. The alternative launch scenario may be desirable under high vehicle weight conditions, such as with trucks at or near gross capacity vehicle weight. It should be noted that the configuration of powertrain 10 also allows for torque smoothing by the motor 18.

To sequentially establish the second forward drive ratio, torque-transmitting mechanism 88 is disengaged and torque-transmitting mechanism 90 is engaged while torque-transmitting mechanism 80 remains engaged. The third forward drive ratio is established by releasing torque-transmitting mechanism 90 and engaging torque-transmitting mechanism 82 while torque-transmitting mechanism 80 remains engaged. The fourth forward drive ratio is established by releasing torque-transmitting mechanism 82 and engaging torque-transmitting mechanism 84 while maintaining engagement of torque-transmitting mechanism 80. The fifth forward drive ratio is established by releasing torque-transmitting mechanism 80 and engaging torque-transmitting mechanism 82 while maintaining engagement of torque-transmitting mechanism 84. Finally, the sixth forward drive ratio is established by releasing torque-transmitting mechanism 82 and engaging torque-transmitting mechanism 90 while engagement of torque-transmitting mechanism 84 is maintained. The sequence of controlled engagement and release of the various torque-transmitting devices is shown in FIG. 4. Thus, torque-transmitting mechanism 88, which controls the torque-transmitting operation of a planetary gear member, i.e., carrier 96, is the launch clutch: it is engaged to initiate both forward and reverse operation of the transmission 22.

Referring again to FIG. 1, the elimination of a torque converter or other hydrodynamic fluid drive facilitates packaging improvements compared to the prior art, such as the placement of the motor 18 within the transmission housing 128.

The controller 52 is configured to cause the engine to operate in the first mode of operation when the engine is required to supply power. The controller is configured to cause the engine to operate in the second or third mode of operation, i.e., with the intake and exhaust valves disabled, when the vehicle is at rest, when the motor 18 is supplying all motive power to the input shaft 62, and during regenerative braking, i.e., when the motor 18 is driven by the input shaft 62 and acting as a generator to recharge a battery (not shown).

An accessory 134 such as a pump or HVAC compressor is connected to the crankshaft 26 via a belt drive 138 on the opposite side of the engine block 32 from the transmission 22. The accessory 134 is driven during the second mode of engine operation by the motor 18 via the crankshaft 26.

While the best mode for carrying out the invention has been described in detail, those familiar with the art to which this invention relates will recognize various alternative designs and embodiments for practicing the invention within the scope of the appended claims.

The invention claimed is:

1. A vehicle powertrain comprising:
   an engine having a rotatable crankshaft and a plurality of cylinders each with a corresponding selectively activatable and deactivatable cylinder valve operatively connected thereto; wherein each of said selectively activatable and deactivatable cylinder valves opens and closes with crankshaft rotation when activated and remains closed irrespective of crankshaft rotation when deactivated; and wherein every cylinder in the engine is characterized by an operative condition in which the corresponding cylinder valve is activated, and an inoperative condition in which the corresponding cylinder valve is deactivated;
   an electric motor in hybrid combination with the engine; and
   a valvetrain mechanism operable to mechanically, not electromechanically, actuate each of said selectively activatable and deactivatable cylinder valves.

2. The vehicle powertrain of claim 1, further comprising a controller sufficiently configured to selectively activate and deactivate the valves, and configured to selectively cause a mode of engine operation in which every cylinder in the engine is in the inoperative condition by deactivating all the cylinder valves.

3. The hybrid vehicle powertrain of claim 1, further comprising a transmission operatively connected to the engine and the motor; and wherein the powertrain is characterized by the absence of a hydrodynamic fluid drive.

4. The hybrid vehicle powertrain of claim 3, wherein the motor includes a rotor; wherein the transmission includes an input shaft operatively connected to the rotor and the crankshaft, an output shaft, and a selectively engageable and disengageable torque transmitting mechanism; and wherein the powertrain is configured such that the torque transmitting mechanism is selectively controllable to initiate vehicle launch by operatively interconnecting the input shaft and the output shaft.

5. The hybrid vehicle powertrain of claim 4, wherein the powertrain is sufficiently configured such that the torque transmitting mechanism is engageable prior to torque generation by the motor such that the motor initiates vehicle launch.

6. The hybrid vehicle powertrain of claim 5, further comprising a controller being operatively connected to the motor to cause selective torque generation by the motor, operatively connected to the torque transmitting mechanism to cause selective engagement of the torque transmitting mechanism, and being configured to cause the torque transmitting mechanism to engage prior to causing activation of the motor such that the motor initiates vehicle launch.

7. The hybrid vehicle powertrain of claim 1, further comprising a transmission operatively connected to the engine and the motor; and wherein the transmission includes an input shaft and the motor includes a rotor, and wherein the input shaft is continuously operatively connected to the rotor and the crankshaft for rotation therewith.

8. The hybrid vehicle powertrain of claim 7, wherein the transmission includes at least one torque multiplying device having a plurality of members, and wherein the input shaft is continuously connected to one of said plurality of members for rotation therewith.

9. The hybrid vehicle powertrain of claim 8, further comprising a torque transmitting mechanism selectively engageable to control the torque transmitting operation of one of said plurality of members and configured to initiate forward or reverse operation of the transmission.

10. The hybrid vehicle powertrain of claim 1, wherein the powertrain is characterized by the absence of a starter motor.

11. The hybrid powertrain of claim 1, further comprising a vehicle accessory operatively connected to the crankshaft to be driven thereby; wherein the accessory is drivable by the motor via the crankshaft when said at least one cylinder is in the inoperative condition.

12. The hybrid powertrain of claim 1, wherein the motor includes a rotor; and wherein the rotor is continuously connected to the crankshaft for unitary rotation therewith.

13. The vehicle powertrain of claim 1, further comprising:
a controller sufficiently configured to selectively activate and deactivate the valves and configured to selectively cause a mode of engine operation wherein a first of said cylinders is in the operative condition while a second of said cylinders is in the inoperative condition during a first time period, and wherein the first of said cylinders is in the inoperative condition while the second of said cylinders is in the operative condition during a second time period.

14. A vehicle powertrain comprising:
an engine having a plurality of cylinders each with a corresponding plurality of selectively activatable and deactivatable cylinder valves operatively connected thereto; wherein every cylinder in the engine is characterized by an operative condition in which the corresponding cylinder valves are activated, and an inoperative condition in which the corresponding cylinder valves are deactivated;
an electric motor in hybrid combination with the engine; and a transmission operatively connected to the motor and the engine;
a controller sufficiently configured to selectively activate and deactivate the valves and configured to selectively cause a mode of engine operation wherein a first of said cylinders is in the operative condition while a second of said cylinders is in the inoperative condition during a first time period, and wherein the first of said cylinders is in the inoperative condition while the second of said cylinders is in the operative condition during a second time period; and
a valvetrain mechanism operable to mechanically, not electromechanically, actuate each of said selectively activatable and deactivatable cylinder valves.

15. A vehicle powertrain comprising:
an engine having a rotatable crankshaft, at least one cylinder, a plurality of selectively activatable and deactivatable cylinder valves operatively connected to said at least one cylinder so that said at least one cylinder is characterized by an operative condition in which the plurality of cylinder valves are activated and an inoperative condition in which the plurality of valves are deactivated, and a controller configured to selectively activate and deactivate said cylinder valves;
an electric motor in hybrid combination with the engine; and a transmission operatively connected to the engine and the motor;
a valvetrain mechanism operable to mechanically, not electromechanically, actuate each of said selectively activatable and deactivatable cylinder valves;
wherein each of said selectively activatable and deactivatable cylinder valves opens and closes with crankshaft rotation when activated and remains closed irrespective of crankshaft rotation when deactivated; and
wherein the engine is characterized by an idle mode, and wherein the controller is configured to cause said at least one cylinder to be in the inoperative condition when the engine is in the idle mode.

16. A hybrid powertrain comprising:
an engine having a rotatable crankshaft and being characterized by at least one cylinder, at least one selectively deactivatable intake valve movable between an open position in which gas may be drawn into said at least one cylinder and a closed position in which gas cannot be drawn into said at least one cylinder, and at least one selectively deactivatable exhaust valve movable between an open position in which gas may be exhausted from said at least one cylinder and a closed position in which gas cannot be exhausted from said at least one cylinder; a controller operatively connected to said at least one intake valve and said at least one exhaust valve and configured to selectively deactivate the valves so that said at least one intake valve and said at least one exhaust valve remain in their respective closed positions during crankshaft rotation to prevent the engine from drawing air into any cylinder or exhausting gas from any cylinder;
a valvetrain mechanism operable to mechanically, not electromechanically, actuate each of said at least one selectively deactivatable intake valve and said at least one selectively deactivatable exhaust valve;
an electric motor having a rotor continuously connected to the crankshaft for rotation therewith; and
a transmission having an input shaft, at least one planetary gearset having a plurality of members, and a torque transmitting mechanism selectively engageable to control the torque transmitting operation of one of said plurality of members and configured to initiate forward or reverse operation of the transmission; wherein the input shaft is continuously connected to the crankshaft, rotor, and one of said plurality of members for rotation therewith.

* * * * *